Feb. 26, 1929.   J. LEDWINKA   1,703,114
AUTOMOBILE BODY
Filed Oct. 23. 1922   4 Sheets-Sheet 1
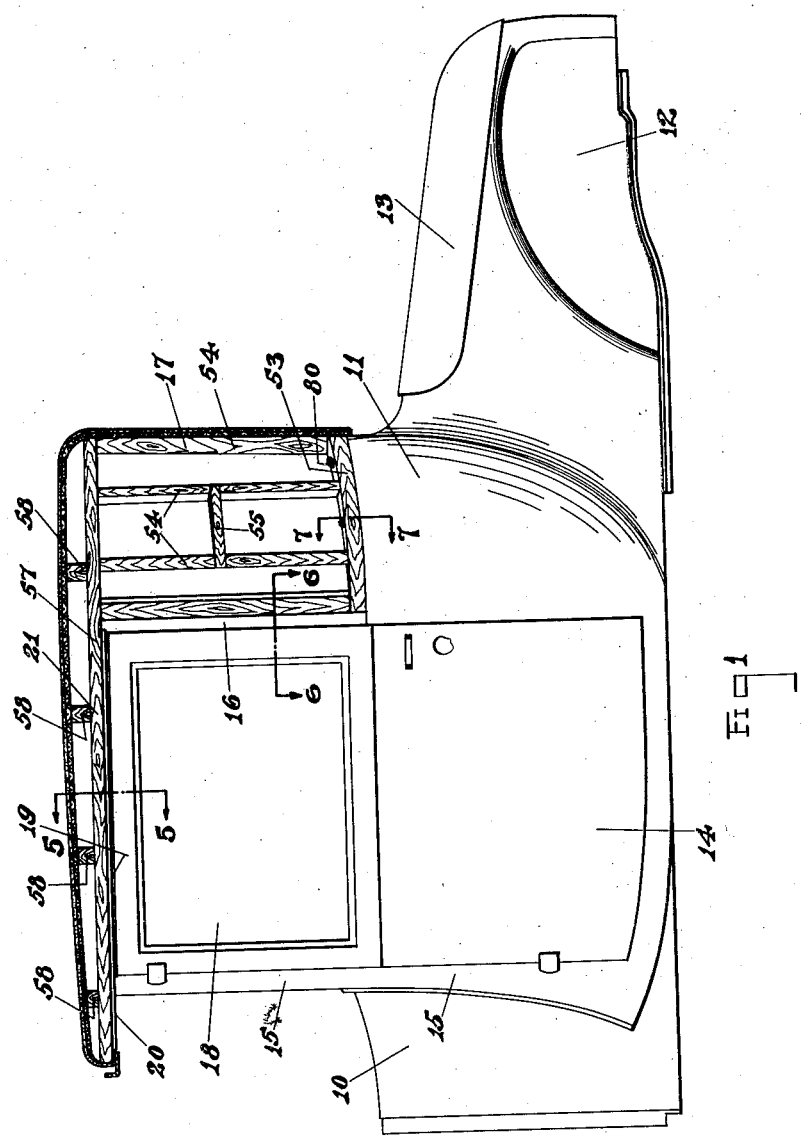
INVENTOR.
JOSEPH LEDWINKA.
BY
ATTORNEY
WITNESS:—
Walter M. Trout.

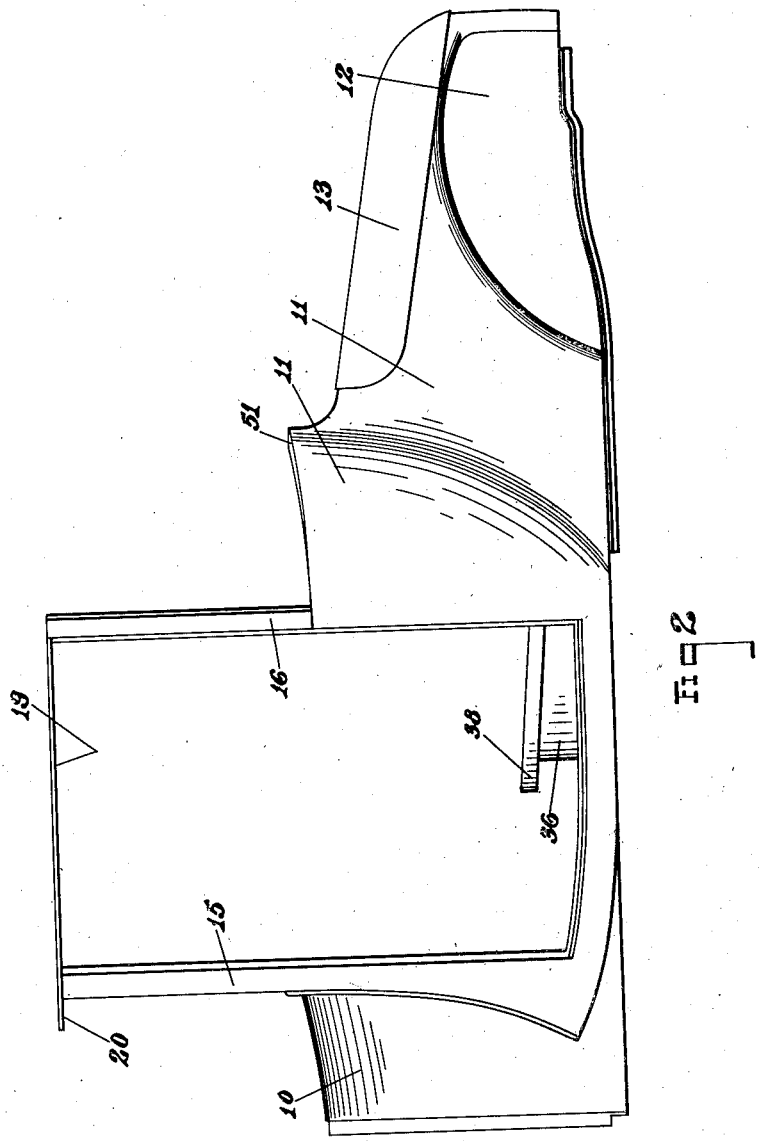

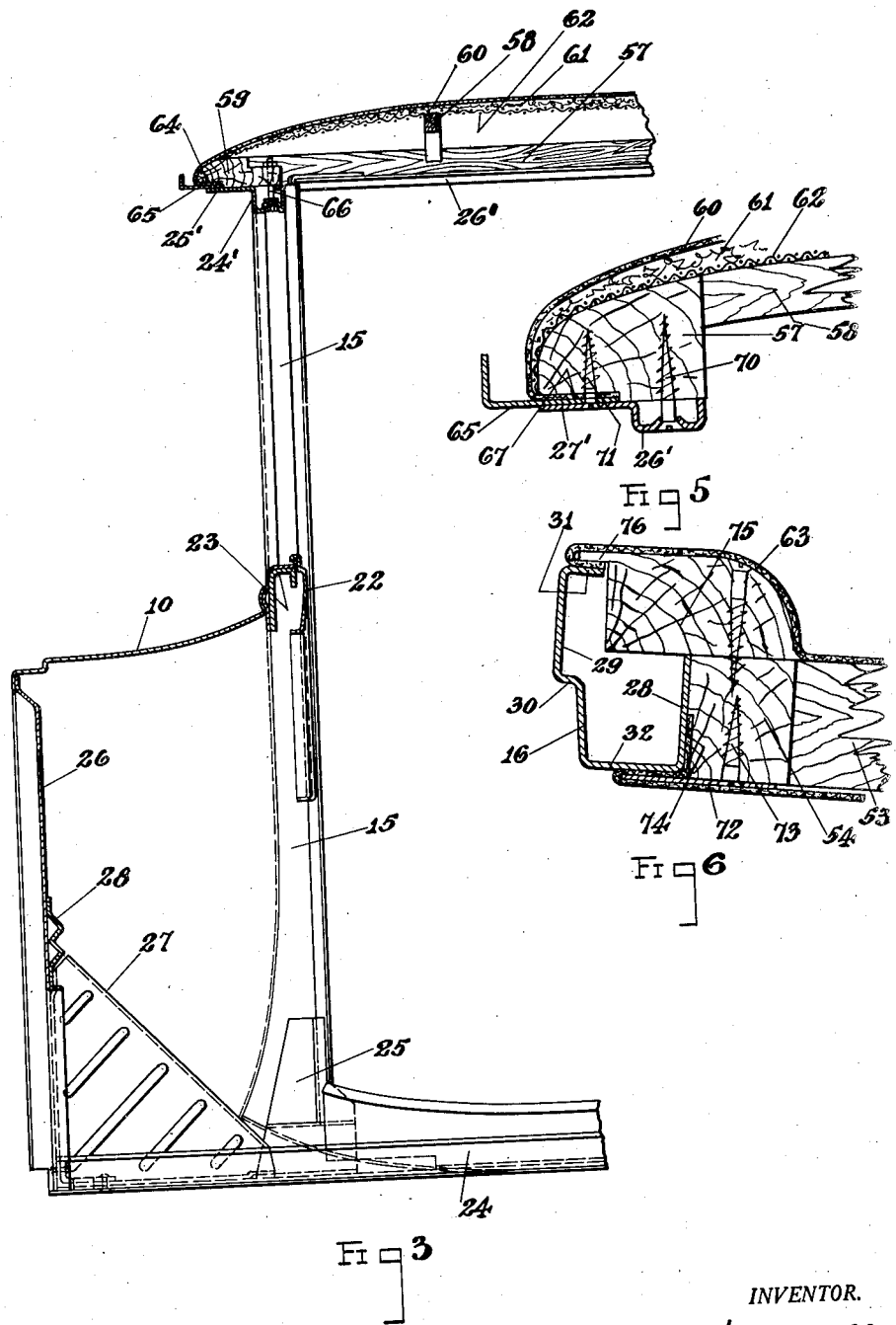

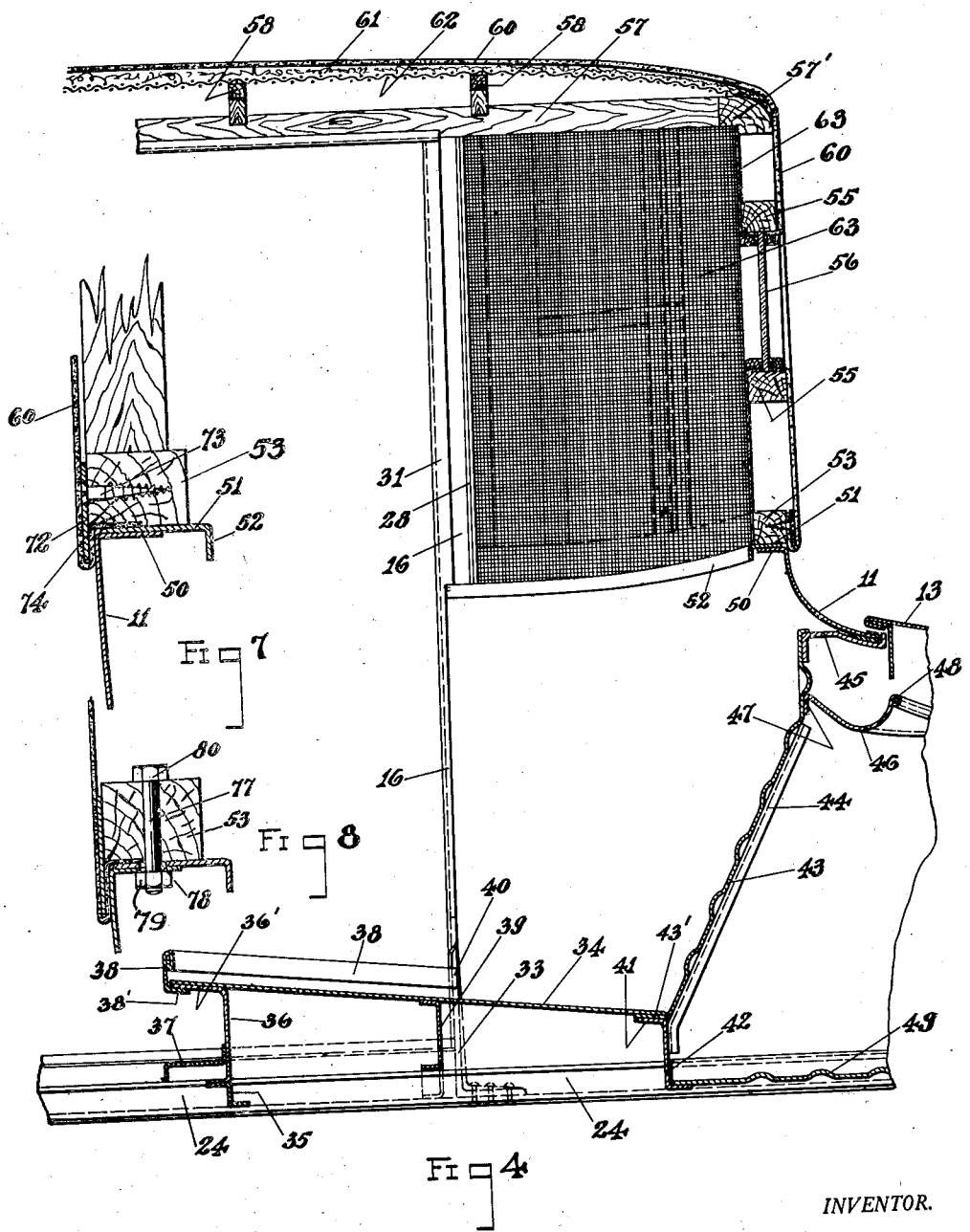

Patented Feb. 26, 1929.

1,703,114

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY.

Application filed October 23, 1922. Serial No. 596,216.

My invention relates to improvements in automobile bodies and has to do, more particularly, with automobile bodies of the closed type.

The principal object of my invention is to provide an automobile body, of the closed type, which is particularly strong and durable, but nevertheless, light in weight.

A further object of my invention is to provide an automobile body, of the closed type, of such a construction that it may be manufactured economically and efficiently in large quantities.

A further object of my invention is to provide an automobile body, of the closed type, which is made up of two separable units, one of said units being constructed entirely of metal members and constituting the body proper, and the other including top material and fabric and constituting the roof unit applied to the body unit.

A further object of my invention is to provide an automobile body, of the closed type, having a removable and detachable roof unit which may be removed from the body whenever it is desired to repair or replace the upholstering or the top material.

A further object of my invention is to provide an automobile body, of the closed type, having a separable roof unit which may be manufactured separately and attached to the body unit as one of the final steps in the manufacture of the body.

Another object of my invention is to provide a coupé body having a detachable roof unit forming the top and upper back portion of the body.

A further object of my invention is to provide an automobile body, of the closed type, comprising a body unit of such construction that it may be subjected to a baking temperature to bake an enamel thereon, and a separable roof and back unit which may be upholstered and covered with top material and then mounted on the enameled body unit.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is a view, in side elevation, of a coupé body constructed in accordance with my invention, the top material being broken away from the roof unit in order to show the framework thereof.

Fig. 2 is a view, in side elevation, of the body unit with roof unit and doors removed.

Fig. 3 is a vertical, sectional view through the forward portion of the body, taken along the longitudinal center line.

Fig. 4 is a vertical, sectional view through the rear portion of the body, taken along the longitudinal center line.

Fig. 5 is a detail, sectional view, taken on the line 5—5 of Fig. 1, and showing the connection between the side header and the roof unit.

Fig. 6 is a detail, sectional view, taken on the line 6—6 of Fig. 1, and showing the connection between a rear door post and the roof unit.

Fig. 7 is a detail, sectional view, taken on the line 7—7 of Fig. 1, and showing the joint between the roof unit and the upper edge portion of the rear panel, and Fig. 8 is a similar view showing the connection between the roof unit and the upper portion of the rear body panel.

In the drawings, the same reference numerals refer to the same parts throughout the several views and the sectional views are taken looking in the direction of the arrows at the ends of the section lines.

It is the purpose of my present invention to provide a closed body which is composed of two separable units. One of these units consists of the body proper, including the body shell and the skeleton frame which reinforces the shell and takes the stresses and strains imposed on the body in use. This body unit may be constructed entirely of metal and, therefore, can be subjected without injury to a baking temperature for the purpose of baking an enamel thereon to give the body the desired finish. The other unit is the roof unit and includes a framework which may be covered on the outside with top material and on the inside with suitable upholstery. In the case of a coupé body, this roof unit includes not only the roof but also the upper back portion of the body. It is extremely important in any closed body construction that the doors shall be so mounted that they will fit the body accurately and will not be likely to be distorted or sprung out of alignment by the stresses and strains which come upon the body in use and it is among the purposes of my present invention to provide the body unit with door frames extending from the floor line to the roof line of the body, in which frames the doors may be mounted and swung. I propose to accomplish the purposes of my invention by providing a body unit which may be constructed entirely of metal and which differs from the corresponding type of open body, in that the door posts extend above the upper edges of the body panels to points at or near the roof line of the body. The upper ends of these posts may be connected together so as to give the structure rigidity. Upon this body unit, I propose to mount a roof unit made up of a frame, the outside of which may be covered with suitable top material. If desired, the inner side of this frame may be covered and concealed by suitable upholstery. This roof unit preferably includes a back portion which forms the rear upper portion of the body and rests upon the upper edge portion of the rear body panel. I propose to detachably secure this roof unit to the body unit, so that it may be removed from the latter when it is desired to repair the roof unit or replace the top material or upholstery thereon, and, also, in order that the roof unit may be constructed separately from the body unit and quickly and easily mounted on the latter after the latter has been enameled and substantially completed. The roof unit is supported by the upper ends of the door posts and by the upper edge portions of the rear body panel and I propose to detachably secure the roof unit thereto.

The coupé body which I have illustrated in the accompanying drawings comprises a body unit having a skeleton frame, made up of sheet metal stampings, for the purpose of taking the stresses and strains which come upon the body in use, and a body shell made up of sheet metal panels applied externally to the frame and rigidly secured thereto, so as to give external appearance to the body. This body unit comprises the cowl panel, 10, and the rear panel, 11, which is shaped to form the sides and the rear deck of the body and is provided with a portion, 12, forming a wheel housing. A cover, 13, covers the opening formed in the rear deck. The skeleton frame includes the front door posts, 15, and the rear door posts, 16, all of which extend considerably above the upper edges of the body panels to which they are secured. These door posts define between them door openings in the sides of the body in which the doors, 14, are mounted, said doors being hinged to the front door posts, 15. The doors, 14, have suitable openings, 18, in the upper part thereof, which may be closed by a sliding window-glass. The upper ends of the door posts, 15 and 16, on the same side of the body, are connected by the side headers, 19, and the upper ends of the front door posts, 15, are connected by the front header, 20, which extends over the windshield.

The skeleton frame for the body unit includes a pair of longitudinally-extending, pressed metal, body sills, 24, one located at each side of the body, to which sills the lower ends of the door posts, 15 and 16, are rigidly secured. For instance, the lower ends of the front door posts, 15, are rigidly secured to the body sills, 24, by the brackets, 25, as indicated in Fig. 3. The forward portion of the body unit includes the cowl panel, 10, which is shaped to such contour as to form that portion of the body shell in front of the front door opening. The lower side portions of this cowl panel are flanged under and rigidly secured to the forward portions of the body sills, 24, and the rear side portions of the cowl panel are flanged around and rigidly secured to the front door posts, 15. The rear upper edge portion of the cowl panel, 10, is flanged over and rigidly secured to a cross member, 23, which extends from one side of the body to the other, beneath the windshield and to which the supporting panel, 22, for the instrument board is rigidly secured. A shroud pan, 26, is secured to the forward edges of the cowl panel and reinforces and strengthens the forward portions of the cowl structure. The cowl panel also carries the supports, 27 and 28, for the toe-boards. As I have indicated above, the door posts, 15, do not stop at the upper edges of the cowl panel but project above the cowl panel to the roof line of the body. The upper ends of the door posts, 15, are connected by the front header, 20, which comprises the channel portion, 24', and the forwardly-projecting flange, 25'. The ends of this header are rigidly secured to the upper ends of the door posts by welding, or otherwise. The door posts, 15, and this header, 20, may also form a frame to receive the windshield sections. The rear body panel, 11, is formed to suitable shape and contour to constitute the rear portion of the body shell and the lower, side portions of this panel are flanged under and rigidly secured to the rear portions of the body sills, 24. The rear door posts, 16, are rigidly secured to said body sills by the brackets, 33, and the forward, side portions of the rear panel, 11, are flanged around and rigidly secured to the lower portions of the door posts, 16. These door posts, 16, also project above the upper edge of the rear panel, 11, and such upper portions of the door posts have the cross section illustrated in Fig. 6. As shown in that figure, the upper portion of the door post is, in general, channel-shaped, having a short leg, 28, and a longer leg, 29, which is offset at 30 to form a stop shoulder, and has an inturned flange, 31, at its inner edge. The base of the channel is indicated at 32. The upper ends of the door posts, 16, are connected to the upper ends of the door posts, 15, on the same side of the body, by the side headers, 19. These side headers are of the cross section shown in Fig. 5 and comprise the channel portion, 26', and the laterally-extending flange, 27'. The channel portion 26' forms a stop shoulder for the upper edge of the door. The ends of the side headers are rigidly connected by welding, or otherwise, to the upper ends of the door posts, 15 and 16.

The construction of the rear portion of the body unit is shown very clearly in Fig. 4 of the drawings. The seat pan, 34, is supported in inclined position by the cross members, 35, 39 and 42, carried by the body sills, 24. A heel-board, 36, rests on and is secured to the cross member, 35, and has a flange, 36', at its upper edge, which supports the forward portion of the seat pan. The heel board is reinforced by a cross member, 37, the ends of which are rigidly secured to the body sills, 24. A cushion retaining strip, 38, is curved to conform to the shape of the seat pan, 34, and provided with a flange, 38', which extends under and is fastened to the forward and side portions of the seat pan. The rear ends of the cushion retaining strip, 38, are secured, at 40, to the door posts, 16. The cross member, 39, the ends of which are rigidly secured to the body sills, 24, supports the intermediate portion of the seat pan. The cross member, 42, which is likewise secured to the body sills, is provided with a forwardly-extending flange, 41, at its upper edge, which extends under and is secured to the rear portion of the seat pan, 34. An inclined panel, 43, forms the seat back and this panel has a flange, 43', at its lower edge which is turned forwardly and inserted between the flange, 41, and the rear portion of the seat pan, 34, these three parts being fastened together. The sides of the panel, 43, are supported by strips, 44, secured to the inner side surfaces of the rear panel, 11. A transverse reinforcing strip, 45, is secured to the upper edge of the panel, 43, and is connected to the rear panel, 11, at a point adjacent the opening in the rear deck. The edge of this reinforcing member forms a stop for the cover, 13. A curved stamping, 46, provided with a bead, 48, at its free edge, has a flange, 47, at the opposite edge, which is rigidly secured to the panel, 43, so that the curved stamping, 46, is located beneath the joint between the cover, 13, and the rear panel, 11, and forms a drip trough to catch and carry away any water running through this joint. A sheet metal panel, 49, supported by the body sills, 24, and the rear cross member, 42, forms the floor for the rear storage compartment of the body. The upper edge of the rear panel, 11, is flanged inwardly, at 50, said flange being curved to conform to the sides and back of the seat and extending from one door post of the body to the other. A garnish rail, 51, is applied to and rigidly secured to the flange, 50, and said garnish rail has a downwardly-extending flange, 52, at its inner edge so that the rail, 51, forms, with the rear panel, 11, an inverted channel to receive the upper portions of detachable upholstery sections.

The body unit which I have just described is constructed entirely of metal and, therefore, it is particularly strong and durable for its weight. Furthermore, this body unit can be made and assembled very readily on a large scale, due to the fact that the parts are largely sheet metal stampings which lend themselves very readily to production and assembly in large quantities. Due to the fact that this body unit is constructed entirely of metal, it may be subjected to a baking temperature without injury and, therefore, this body unit may be coated with enamel and the coating of enamel baked upon the body, thus giving a very superior finish and one that is very durable. Due also to the fact that this body unit is constructed entirely of metal, it will not be affected by weather conditions or changes. It is particularly to be noted that the door frames formed by the door posts, 15 and 16, and the headers, 19, connecting their upper ends, constitute a part of the skeleton frame of the body unit and are rigidly connected in the body structure so that their position with respect to the body is absolutely fixed. As the doors are swung on these frames, being hinged to the forward door posts, 15, the doors will always fit and there is no danger of the door posts warping or being sprung out of alignment so that the doors will not close properly.

To complete this closed body construction, I provide a roof unit comprising the back portion, 17, and the top portion, 21, which roof unit is mounted on the upper edge portion of the rear panel, 11, and on the upper ends of the door posts, 15 and 16. This roof unit is made up of a wooden framework to which the top material and the upholstery is fastened. The back portion of the roof unit comprises the lower frame member, 53, which is curved to conform to the curvature of the garnish rail, 51, at the upper edge of the rear panel, 11, and a plurality of upright members, 54, which extend vertically upward from said lower frame member, 53. These upright members, 54, are reinforced at intervals by transverse braces, 55, and two of these braces, 55, are arranged between two of the rear upright members, 54, so as to form a frame for the rear window, 56. The top portion of the roof unit framework is formed by the longitudinally-extending frame members, 57, the forward ends of which are connected by the cross member, 59. This top portion of the framework extends forwardly from the back portion, 17, and the upper ends of the upright members, 54, are fastened to the rear cross member, 57', and the rear portions of the side frame members, 57. The side frame members, 57, are connected at intervals by the cross bows, 58. It is to be noted that this framework comprises a vertically-extending back portion, which is curved to conform to the shape to be given the upper portion of the body, and a top portion which extends horizontally forward from the upper part of this back portion. This roof unit may be covered externally by flexible top material, 60, of rubberized fabric, artificial leather, or any other suitable material and, over the top portion of the roof unit, a layer of wadding, 61, is interposed between the inner surface of the top material, 60, and a sheet of wire mesh, 62, all of said layers being tacked to the framework of of the roof unit. The sheet of top material, 60, extends downwardly over the outer surface of the framework of the back portion, 17, and is tacked thereto. Suitable fabric, 63, is tacked to the inner side of the framework so as to finish the interior thereof and conceal the framework. At the forward end of the top portion, 21, of the roof unit, the layer, 60, of top material is folded under the front cross member, 59, and an angle strip, 65, is fastened to said front cross member so as to clamp this folded-in portion, 64, between said angle member and the cross member, 59. At the sides of the top portion of the roof unit, the sheet, 60, of top material is likewise folded in under the side frame members, 57, as indicated at 67, and is secured in such position by the angle member, 65, which is applied thereover and secured to the side frame member. This angle member, 65, is in the form of a strip which is curved to conform to the shape of the roof and the upright portion of the angle member, 65, is spaced somewhat from the edge of the roof, so as to form a drip channel around the edge thereof to prevent water from running from the roof and dripping over the windshield and the door openings. At the lower edge of the back portion of the roof unit, the sheet, 60, of top material is secured to the frame by folding a portion, 74, thereof around a metal strip, 72, which is secured to the lower frame member, 53, by the screws, 73. The edge portion, 74, of the sheet of top material is then tacked to the lower surface of frame member, 53, as shown in Fig. 7. In this way, the strip, 72, and the heads of the screws, 73, are effectively concealed. The strip, 72, projects below the lower edge of the lower frame member, 53, so as to form a projecting flange, covered by the top material, which conceals the joint between the body unit and the roof unit, as will appear from Figs. 7 and 8. At the forward, side edges of the back portion, 17, of the roof unit, the top material is fastened in a similar manner, the strip, 72, being secured to the upright frame member, 54, which lies against the door post, 16. The said upright frame member has a molding strip, 75, which fits into the door post, 16, so that the end thereof lies against the inturned flange, 31, of the door post and the sheet, 63, of fabric, which is secured to the interior of the framework, may be turned as at 76 to project over the flange, 31, so as to conceal the joint.

It is to be noted that this roof unit requires a great deal of hand work in that the top material, and the fabric which finishes the inside of the unit, have to be nailed or tacked to the framework by hand and the framework itself has to be built up by hand. This unit, however, can be built up and substantially finished on the bench before it is mounted on the body. This is a decided advantage because the body unit takes up a considerable amount of room, as compared with the roof unit, and the body units can be moved through the shop faster than would be the case if these hand operations had to be carried out on the completed body. This results in factory economy and reduces the cost of manufacture.

The roof unit is mounted on the body unit with the lower frame member, 53, resting on and supported by the garnish rail, 51, at the upper edge of the rear panel, 11. The forward pair of the several upright frame members, 54, fit against the upper portions of the door posts, 16, as shown in Fig. 6. The top portion of the roof unit rests upon and is supported by the upper ends of the door posts, 15 and 16, the side frame members, 57, resting on and being supported by the side headers, 19, as shown in Fig. 5, while the front cross member, 59, rests on and is supported by the front header, 20, as shown in Fig. 3. The roof unit is very quickly and easily fastened upon the body unit by the bolts, 77, which pass through the lower frame member, 53, and through openings, 78, in the garnish rail, 51, and the flange, 50, of the rear panel, 11. The heads, 80, of these bolts engage the upper surface of the lower frame member, 53, while the nuts, 79, screwed on the lower ends of the bolts, engage the lower surface of the flange, 50. These nuts are therefore accessible from the inside of the body when the upholstery sections are removed. The side frame members, 57, are fastened to the side headers, 19, by the screws, 70 and 71, and the front cross member, 59, is fastened to the front header, 20, by the bolts, 66.

It will be apparent from the foregoing that this makes a very strong and durable closed body construction which is remarkably light when its strength is considered. The door frame is particularly strong and rigid, forming a part of the skeleton frame of the body and rigidly connected in the body structure so as to take the stresses and strains imposed upon it in use. The roof unit is mounted upon the body unit and secured thereto in such a way that it is absolutely rigid with respect thereto. It may, nevertheless, be removed very quickly and easily if it is desired to renew or replace the top material or the upholstery. This closed body construction is particularly advantageous because the greater portion of the body may be manufactured and assembled by the production methods used in large scale production, while the roof unit, which requires a great deal of hand work, may be made separately and mounted on the body unit as a final step in the production of the closed body. This is important because it makes it unnecessary to detain a large number of bodies for a considerable period of time on the assembling floor, while workmen are applying the top material and the upholstering thereto. A further decided advantage resides in the fact that a coating of enamel may be baked upon the body unit before the roof unit is assembled. This is impossible in closed body constructions, such as have been made heretofore, because the framework for the top forms a part of the body framework and, such framework being made of wood, will not stand the temperature necessary to bake a coating of enamel on the body panels. As a result, I am able to make a closed body at a lower cost and having a better finish than has been possible heretofore.

In the accompanying drawings, I have illustrated a closed body of the coupé type but my invention is not to be restricted to coupé bodies as it is also applicable to other closed bodies. A distinguishing feature of my invention is that the door posts extend above the upper edges of the body panel up to the roof line of the body and form supports for the roof unit.

I am aware that the body construction illustrated in the accompanying drawings and described in this specification may be changed and varied considerably, without departing from the spirit of my invention. I do not wish, therefore, to be restricted to the specific disclosure and claim my invention broadly, as indicated by the appended claims.

Having thus described my invention, what I claim as new and useful and desire to secure by Letters Patent is:

1. In an automobile structure of the class described, in combination, a roof structure including longitudinally extending stringers at the sides thereof, each of said stringers having its outer lower surface rabbeted, an angle member having one branch thereof seated in said rabbet and the other branch thereof spaced from said stringer to form a drip channel therebetween, a flexible covering for said roof structure having its side edges inturned between said stringers and said angle members, and side headers rigidly supported by the body frame-work, said side headers serving as supports for said longitudinally extending stringers and serving additionally to maintain said angle members and the inturned edges of the flexible covering in position.

2. In an automobile structure of the class described, in combination, a skeleton framework including substantially vertically extending members forming rear door posts for the automobile body, a frame-work shaped to the desired contour to form the back of the automobile body and extending from the door posts on one side of the body to the door post on the other side of the body, said frame-work including upright members having metal strips secured to the outside faces thereof adapted to over-lap the outside faces of the door posts, and a flexible covering for said wooden framework having the ends thereof inturned between said metal strips and said door posts.

3. In an automobile body structure of the class described comprising a skeleton frame including longitudinally extending sill members and a plurality of upwardly extending members rigidly connected to said sill members, a sheet metal rear panel forming the sides and rear of the body and externally applied and rigidly secured to the rear portions of said sills and rear door posts, said panel being provided with an opening in its upper surface adapted to receive a cover therein, an inclined panel member secured at its upper edge to said sheet metal panel forward of the opening therein and at its lower edge to the body sills, and a curved, trough-like stamping rigidly secured to said inclined panel member whereby to constitute a drip trough beneath the joint between said cover and sheet metal panel.

4. In a closed automobile body, the combination with a unitary subassembly having a forward portion extending vertically substantially from the floor line of the body to the roof line thereof and including front and rear door posts extending to the roof line and a rear portion extending from said forward portion but having its upper edge in a plane intermediate said floor and roof lines of the body, of another rigid unitary subassembly having a forward portion extending over and resting upon the vertically extending forward portion of the first-named subassembly and a rear depending portion extending over and resting upon the rear portion of said first-named subassembly, said unitary subassemblies being joined in their final assembly along their adjacent edges to form a unitary closed body structure.

5. A unitary subassembly for a closed automobile body comprising a forward portion extending vertically substantially from the floor line to the roof line of the body and including the cowl, front and rear door posts and headers connecting said posts and a rear portion extending from the floor line to a plane intermediate such line and the roof line and including the lower rear body panelling, the top edges of said forward and rear portions and the rear posts being provided with final assembly joint formations for connection with another unitary subassembly adapted to form therewith a unitary closed body structure.

In testimony whereof, I affix my signature.

JOSEPH LEDWINKA.